(12) United States Patent
Shah et al.

(10) Patent No.: US 11,475,784 B2
(45) Date of Patent: Oct. 18, 2022

(54) METHOD AND SYSTEM FOR SECURELY DISTRIBUTING CONTENT IN AN EXAMINATION

(71) Applicant: Tata Consultancy Services Limited, Mumbai (IN)

(72) Inventors: Viral Prakash Shah, Thane (IN); Rishi Setiya, Thane (IN); Shobhit Shukla, Thane (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 884 days.

(21) Appl. No.: 16/357,113

(22) Filed: Mar. 18, 2019

(65) Prior Publication Data

US 2020/0126439 A1    Apr. 23, 2020

(30) Foreign Application Priority Data

Oct. 22, 2018    (IN) .............................. 201821039741

(51) Int. Cl.
*G09B 7/00*    (2006.01)
*G06F 21/60*    (2013.01)
(Continued)

(52) U.S. Cl.
CPC .............. *G09B 7/00* (2013.01); *G06F 21/602* (2013.01); *H04L 9/0631* (2013.01); *H04L 9/30* (2013.01);
(Continued)

(58) Field of Classification Search
CPC .. G09B 7/00; G09B 7/02; G06F 21/10; G06F 21/32; G06F 21/602; H04L 63/0428;
(Continued)

(56) References Cited

U.S. PATENT DOCUMENTS

2005/0063313 A1    3/2005  Nanavati et al.
2011/0246645 A1*  10/2011  Martin ..................... G09B 7/02
                                                                434/362
(Continued)

OTHER PUBLICATIONS

Alonso, J. et al. "A Novel MAC Protocol for Dynamic ad hoc Wireless Networks with Dynamic Self-Configurable Master-Slave Architecture," *2004 IEEE 15$^{15}$ International Symposium on Personal, Indoor and Mobile Radio Communications*, Barcelona, Spain, Sep. 5-8, 2004; 6 pages.

*Primary Examiner* — Eddy Saint-Vil
(74) *Attorney, Agent, or Firm* — Finnegan, Henderson, Farabow, Garrett & Dunner LLP

(57) ABSTRACT

In the existing processes for the creation and distribution of content such as question papers, there are multiple stages where human intervention is required which leads to huge scope of paper leakage and malpractice. In addition to that these processes require huge manpower and high costs for the distribution of content. A method and system for securely distributing the content in an examination has been provided. The system provides a green paper device that keep the content only accessible for a defined duration and cannot be copied or printed through any medium. The device can be used in invigilator mode as master paper device and the examination mode as receiving paper device. The system also includes a content authoring engine for securely creating or authoring content. The content is transferred from the content authoring engine to the cloud server and to master paper device in a password protected encrypted format.

19 Claims, 7 Drawing Sheets

(51) Int. Cl.
  *H04L 9/06* (2006.01)
  *H04L 9/30* (2006.01)
  *H04L 9/40* (2022.01)
  *G06V 40/16* (2022.01)

(52) U.S. Cl.
  CPC ...... *H04L 63/0428* (2013.01); *H04L 63/0876* (2013.01); *G06V 40/172* (2022.01)

(58) Field of Classification Search
  CPC ..... H04L 63/0876; H04L 9/0631; H04L 9/30; G06V 40/172
  See application file for complete search history.

(56) References Cited

U.S. PATENT DOCUMENTS

2013/0137077 A1* 5/2013 Elangovan ............... G09B 7/02
  434/350
2015/0161903 A1* 6/2015 Colliander ............... G09B 7/02
  434/350

\* cited by examiner

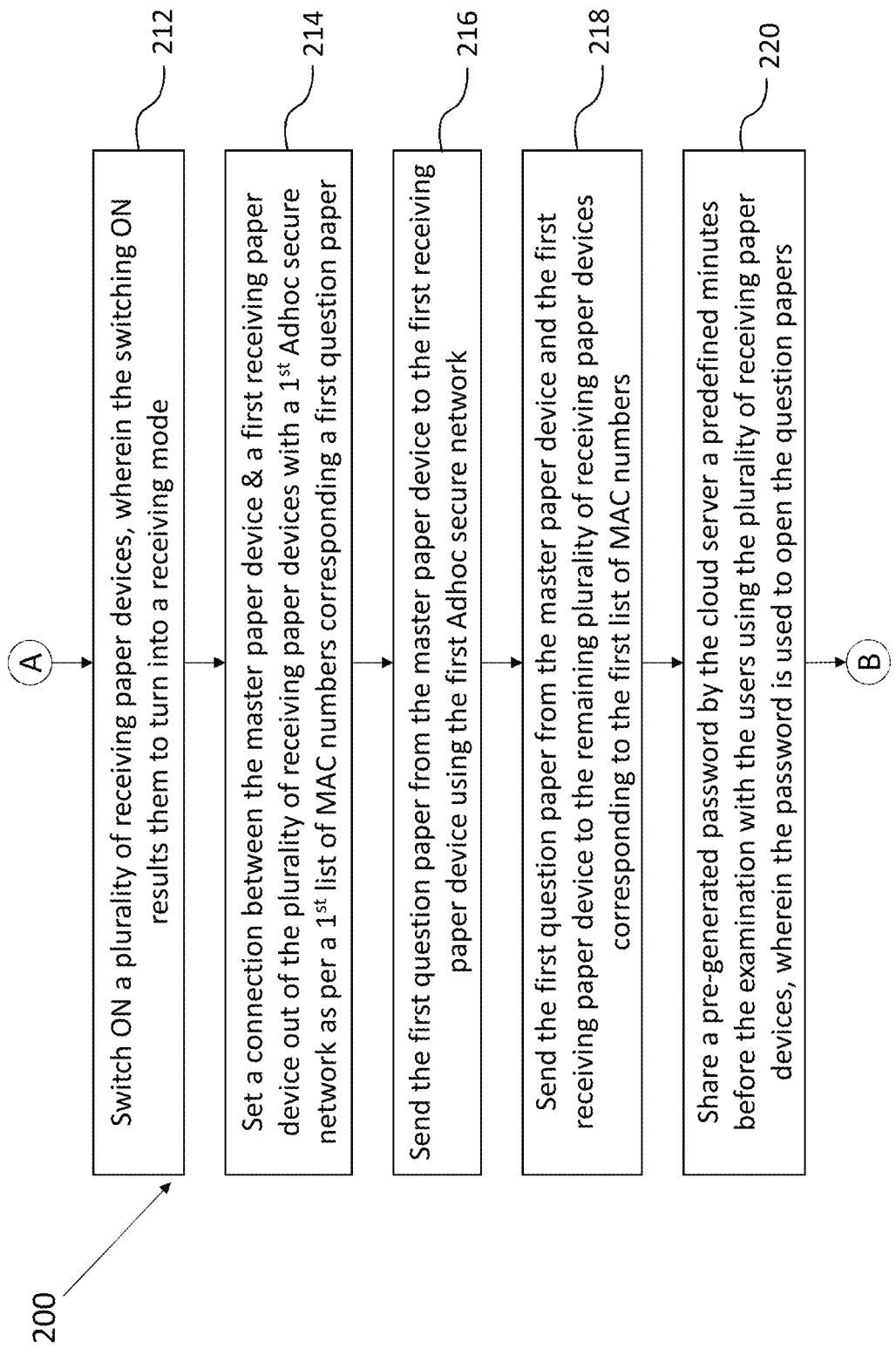

METHOD AND SYSTEM FOR SECURELY DISTRIBUTING CONTENT IN AN EXAMINATION

PRIORITY CLAIM

This U.S. patent application claims priority under 35 U.S.C. § 119 to: India Application No. 201821039741, filed on Oct. 22, 2018. The entire contents of the aforementioned application are incorporated herein by reference.

TECHNICAL FIELD

The embodiments herein generally relates to the field of secure educational assessment. More particularly, but not specifically, the invention provides a system and method for securely distributing content such as question papers in examination.

BACKGROUND

In developing countries like India, still majority of assessment is done on paper pen model or an offline mode of assessment. The computer based assessment is as low as nearly 2%. Computer based assessments are always secure, fast and less effort consuming. But maintaining integrity in offline mode or paper pen based assessment is still a challenge.

Currently the question paper of offline assessments are printed as a hardcopy which leads to huge manpower and costs for distribution to different test centers. It also requires huge logistics effort in transportation of question paper from printing center to city common location then finally to test center. There are multiple stages where human intervention is required which leads to huge scope of paper leakage and malpractice. There is also huge scope of manual mistake where question paper delivered to different test centers having different count and subjects. As a fallback, multiple sets of same subjects are created which will be used as a backup in case of any leakage and if there is no leakage, then that sets of paper will be of no use and that triggers to reverse logistics.

In addition to that in the current process, it's a huge efforts for invigilator to distribute question paper set wise and also there is no mapping that which set is assign to which candidate and can be easily exchanged between one another. There are also possibility to adjacent candidates may get same sets of question paper. Various efforts have been implemented in the field of educational assessment for secure distribution of content.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system for distributing content in an examination. The system comprises a content authoring engine, a cloud server, a master paper device and a plurality of receiving paper devices. The content authoring engine creates the content in the form of one or more question papers, wherein the one or more question papers are encrypted with a security key, wherein each of the one or more question papers is pre-mapped with one or more media access control (MAC) numbers. The cloud server configured to: sync the created one or more question papers, receive a request for access the one or more question papers, wherein the request is received along with a public key, verify the correctness of the public key at the content authoring engine and transfer the one or more question papers along with the mapped one or more MAC numbers in the encrypted format. The master paper device receives the one or more question papers from the cloud server along with the mapped one or more MAC numbers in the encrypted format, the master paper device further configured to send the one or more question papers. The plurality of receiving paper devices receives one or more question papers from the master paper device, wherein the plurality of receiving paper devices further configured to perform the steps of: setting a connection between the master paper device and a first receiving paper device out of the plurality of receiving paper devices with a first Adhoc secure network as per a first list of MACs corresponding to a first question paper using a connection setting module, wherein the connection is used to transfer the first question paper from the master paper device to the first receiving paper device; sending the first question paper from the master paper device and the first receiving paper device to the remaining plurality of receiving paper devices corresponding to the first list of MAC numbers; opening the one or more question papers using a pre-generated password and attempt the question paper by the user to generate an answer sheet, wherein the password is a pre-generated password generated by the cloud server a predefined minutes before the examination and shared with the users using the plurality of receiving paper devices, scanning the answer sheet by the users using their receiving paper devices using a scanning module; and uploading the scanned answer sheet back on the cloud server using the uploading module.

Another embodiment provides a method for distributing content in an examination. Initially, the content is created in the form of one or more question papers on a content authoring engine, wherein the one or more question papers are encrypted with a security key, wherein each of the one or more question papers is mapped with one or more media access control (MAC) numbers corresponding to a plurality of receiving paper devices. Further, the created one or more question papers is synced on a cloud server. In the next step, a request is received from a master paper device for the one or more question papers, wherein the request is received along with a public key. In the next step, the correctness of the public key is verified at the content authoring engine. In the next step, the one or more question papers along with the pre-mapped one or more MAC numbers in the encrypted format are transferred from the cloud server to the master paper device. In the next device, a plurality of receiving paper devices are switched ON, wherein the switching ON results them to turn into a receiving mode. Further, a connection is set between the master paper device and a first receiving paper device out of the plurality of receiving paper devices with a first Adhoc secure network as per a first list of MAC numbers corresponding a first question paper. In the next step, the first question paper from the master paper device is sent to the first receiving paper device using the first Adhoc secure network. In the next step, the first question paper is sent from the master paper device and the first receiving paper device to the remaining plurality of receiving paper devices corresponding to the first list of MAC numbers. In the next step, a pre-generated password is shared by the cloud server a predefined minutes before the examination with the users using the plurality of receiving paper devices, wherein the password is used to open the one or more question papers. In the next step, the one or more question papers is opened using the shared password and attempt the question paper by the user to generate an answer sheet. Further, the answer sheet is scanned by the users using their receiving paper devices. And finally, the scanned answer sheet is uploaded back on the cloud server.

In yet another embodiment, there are provided one or more non-transitory machine readable information storage mediums comprising one or more instructions which when executed by one or more hardware processors cause distributing content in an examination. Initially, the content is created in the form of one or more question papers on a content authoring engine, wherein the one or more question papers are encrypted with a security key, wherein each of the one or more question papers is mapped with one or more media access control (MAC) numbers corresponding to a plurality of receiving paper devices. Further, the created one or more question papers is synced on a cloud server. In the next step, a request is received from a master paper device for the one or more question papers, wherein the request is received along with a public key. In the next step, the correctness of the public key is verified at the content authoring engine. In the next step, the one or more question papers along with the pre-mapped one or more MAC numbers in the encrypted format are transferred from the cloud server to the master paper device. In the next device, a plurality of receiving paper devices are switched ON, wherein the switching ON results them to turn into a receiving mode. Further, a connection is set between the master paper device and a first receiving paper device out of the plurality of receiving paper devices with a first Adhoc secure network as per a first list of MAC numbers corresponding a first question paper. In the next step, the first question paper from the master paper device is sent to the first receiving paper device using the first Adhoc secure network. In the next step, the first question paper is sent from the master paper device and the first receiving paper device to the remaining plurality of receiving paper devices corresponding to the first list of MAC numbers. In the next step, a pre-generated password is shared by the cloud server a predefined minutes before the examination with the users using the plurality of receiving paper devices, wherein the password is used to open the one or more question papers. In the next step, the one or more question papers is opened using the shared password and attempt the question paper by the user to generate an answer sheet. Further, the answer sheet is scanned by the users using their receiving paper devices. And finally, the scanned answer sheet is uploaded back on the cloud server.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 5A-5C is flowchart illustrating steps involved in distributing content in an examination according to an embodiment of the present disclosure.

DETAILED DESCRIPTION

Figure 1:
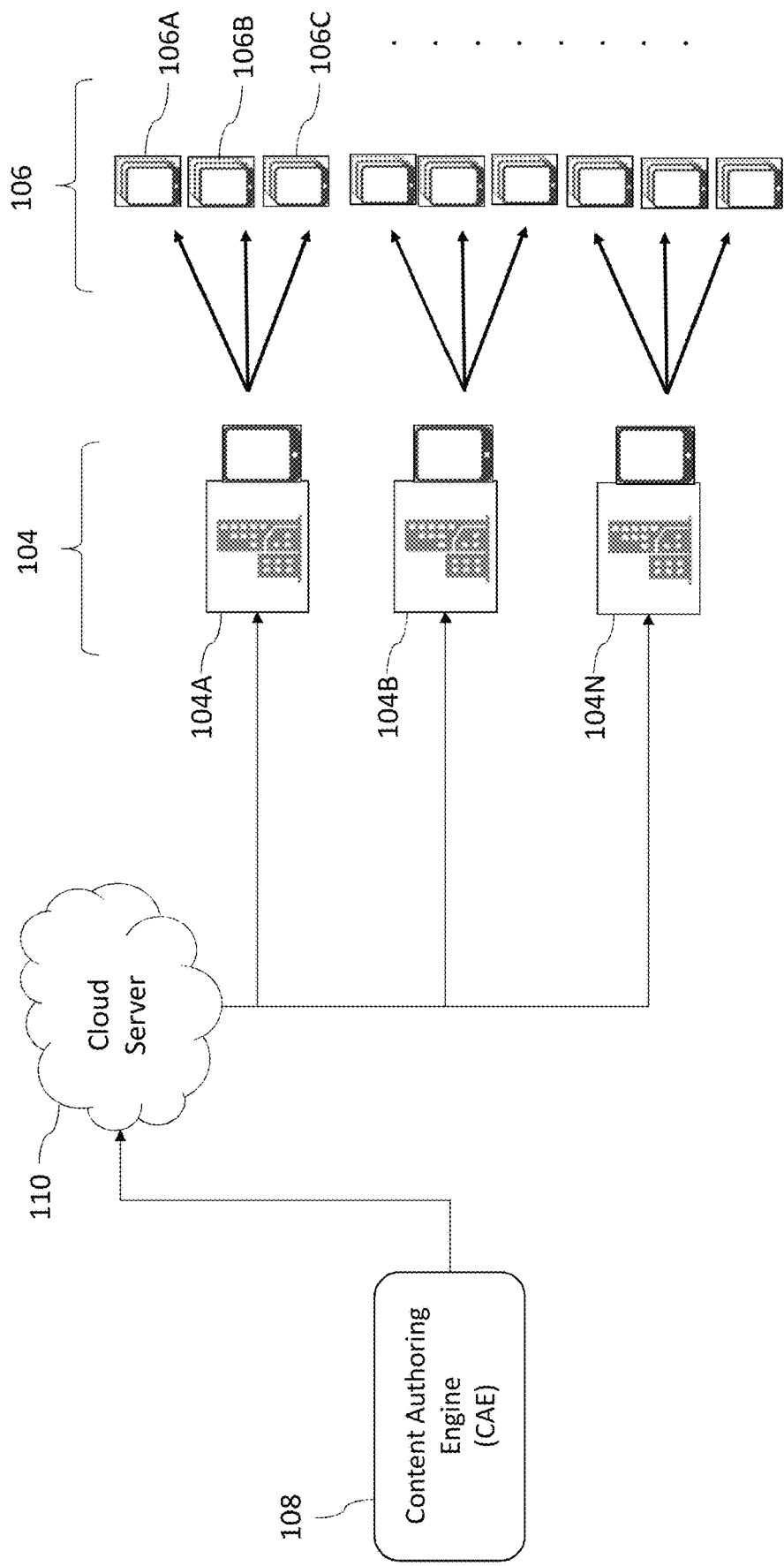
FIG. 1 illustrates an architectural diagram of a system for distributing content in an examination according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

According to an embodiment of the disclosure, a system 100 for securely distributing content in an examination is shown in the architectural flow diagram of FIG. 1. The system 100 is using a method which helps in the creation and distribution of content such as question papers in a secure manner. Further, the created content is kept in a digital format that is encrypted and only accessible to the authorized person just few minutes before the examination. To keep the content in encrypted digital form the system 100 is using a device 102 or an iGreen paper device (iGPD) 102 that keep the content only accessible for a define duration and cannot be copied or printed through any medium.

The device 102 can be used in two modes. First is the invigilator mode, where it can be referred as a master paper device 104. Second is the examination mode where it can be referred as a receiving paper device 106. In the examination mode, a user or a candidate can use the device 102 to see the question paper during the examination. The default configuration of the device 102 is the receiving paper device 106. The present disclosure is explained with the help of more than one master paper devices 104A, 104B . . . 104N, and a plurality of receiving paper devices 106A, 106B . . . 106N as shown in FIG. 1. For the sake of clarity in understanding the numeral 104 will be used to refer the one or more master paper device and numeral 106 will be used to refer the one or the plurality of receiving paper devices unless specifically mentioned.

Figure 2:
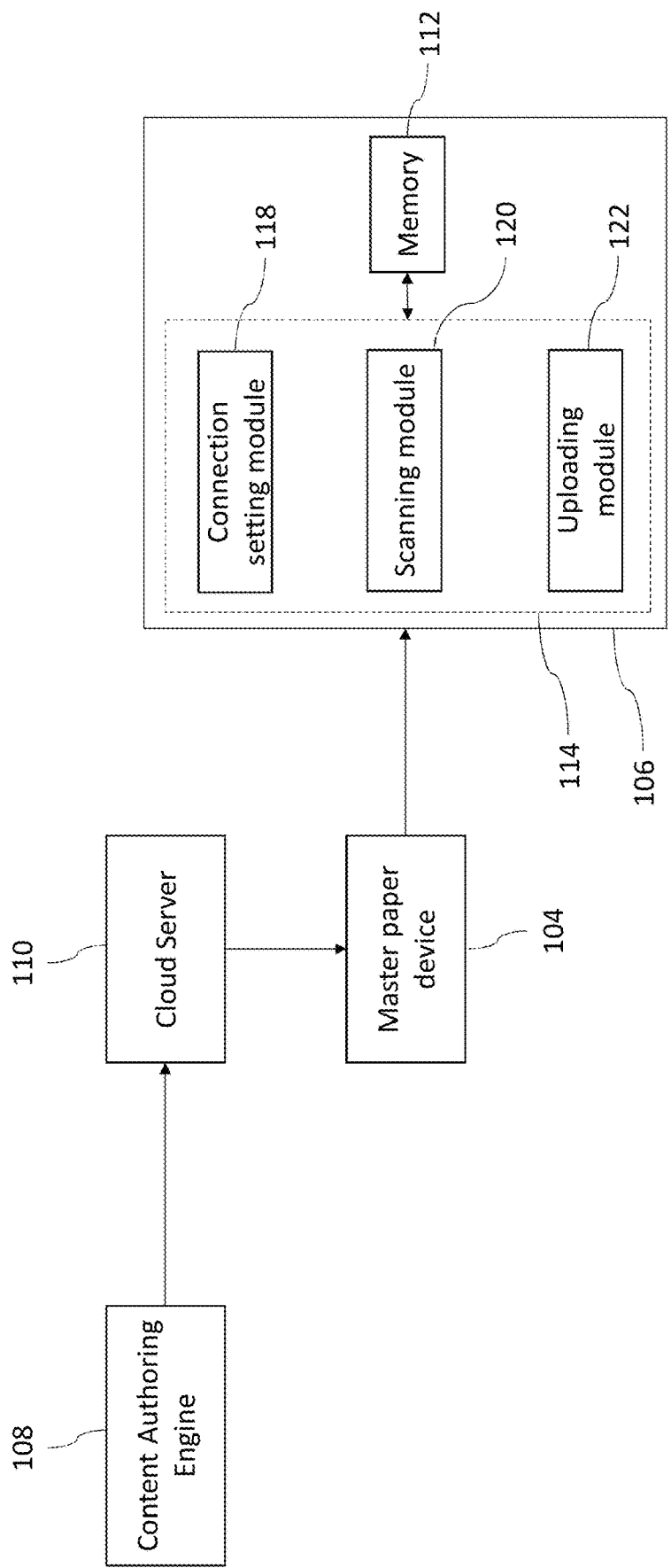
FIG. 2 shows a block diagram of a system for distributing content in an examination according to an embodiment of the present disclosure.

According to an embodiment of the disclosure, the system 100 comprises a content authoring engine 108, a cloud server 110, the master paper device 104 and the plurality of receiving paper devices 106 as shown in the block diagram of FIG. 2. The device 102 further comprises a memory 112 and a processor 114 in communication with the memory 112. The processor 114 further comprises a plurality of modules for performing various functions. The plurality of modules includes a connection setting module 116, a scanning module 118 and an uploading module 120. The plurality of receiving paper devices 106 may also include any other module for performing various other functions.

According to an embodiment of the disclosure, the content is generated on the content authoring engine 108. The content is generated in the form of one or more question papers. The one or more question papers are encrypted with a security key. The content could also be a password or any other information related to examination etc. The content authoring engine 108 can be accessed only by authorized users. The content authoring engine 108 can be configured to generate different types of question papers such as objective type, subjective type etc. The question papers are normally encrypted with AES 256 bit encryption. The use of any other encryption method is well within the scope of this disclosure. In another embodiment of the disclosure, the one or more question papers can be created at some other place and can be uploaded in the content authoring engine 108 in a predefined format such as PDF etc.

According to an embodiment of the disclosure, the system 100 also comprises the cloud server 110. The cloud server 110 is in communication with the content authoring engine 108. Once the content is ready, it is synced on the cloud server 110 in the encrypted format. Whenever required the cloud server 110 shares the one or more question papers with the master paper device 104 post validation. The cloud server 110 also shares the details of candidate's receiving paper devices i.e. media access control (MAC) numbers along with the sequence in which the question paper should flow in those receiving paper devices. Though it should be appreciated that the flow of question paper can also be without any predefined sequence, i.e. the random flow of question paper. The question paper from the master paper device 104 can go to any receiving paper device and then from that receiving paper device, the question paper can go to any random receiving paper device.

Each of the plurality of receiving paper devices 106 are mapped with their respective MAC numbers. In addition to that the plurality of receiving paper devices 106 are also mapped with the roll numbers and each of the MAC numbers are pre-mapped with a set of question paper. Thus, it is pre-decided that which user will get which question paper in the examination. This will help the invigilator to remain tension free at the time of the examination.

According to an embodiment of the disclosure, the master paper device 104 is configured to receive the one or more question papers from the cloud server 110. There could be a first master paper device 104A present at the one examination center. Similarly, a second master paper device 104B can be present at another examination center as shown in FIG. 1. The master paper device 104 is configured to send a request for the one or more question papers. The request is sent along with a public key. The public key is provided for the RSA encryption. If the public key is verified correctly, then only the cloud server 110 send the one or more question papers to the master paper device 104. In addition to the public key, the cloud server 110 is configured to verify a plurality of parameters such as MAC address, distribution pin, Android OS version, authentication and check logs, Md5 checksum, dynamic security token, user agent and location.

According to an embodiment of the disclosure, the system 100 further comprises the plurality of receiving paper devices 106. The plurality of receiving paper devices 106 is present with each of the candidates or users who are appearing for the examination. When the users switch ON their receiving paper devices, it will automatically start searching for the question paper. The question paper will be available on the screen of the receiving paper device 106 whenever the master paper device 104 shares the question paper. Thus, the receiving paper device 106 works on hassle free "zero click" operation for the user. The plurality of receiving paper devices 106 are designed in such a way that no other application is accessible on it. In an example, the roll numbers of the user can be mapped with his receiving paper device. Further in the examination it is already planned that which candidate (roll numbers) will get which question paper set as mentioned above.

The SSID and connection credentials of the Adhoc secure network are programmatically generated by the application depending on the MAC number. No other device with any other application will know this logic of SSID and credentials generation and will not be able to generate.

Every customer when they get the receiving paper devices, during registration/whitelisting process a specific encrypted key is passed from the cloud server 110 to the receiving paper device 106. Later when student opens the application to receive the question paper. The application fetches this encrypted key and the MAC ID, then programmatically generates an SSID with which the network is initiated.

Figure 3:
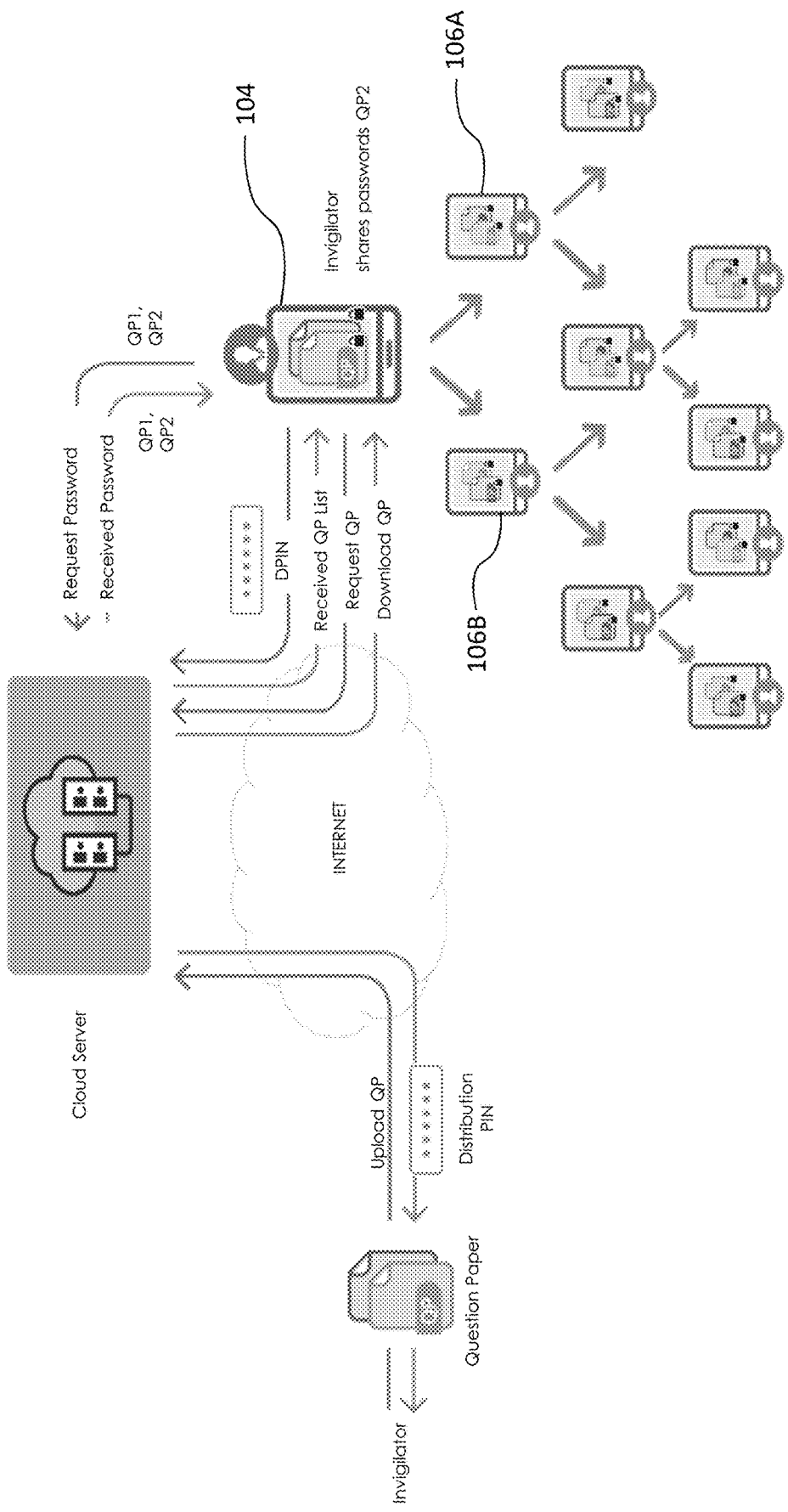
FIG. 3 an architectural diagram of the system of FIG. 1 for distributing the one or more question papers according to an embodiment of the present disclosure.

Further, the invigilator who is using the master paper device 104, will click share button in the master paper device 104. It will start looking for a first Adhoc secure network and a connection is set between the master paper device 104 and a first receiving paper device 106A out of the plurality of receiving paper devices 106 with the first Adhoc secure network as per a first list of MACs corresponding to a first question paper using the connection setting module 116. After successful transmission of the question paper, the master paper device 104 will remove the first entry of MAC number and look for the next receiving paper device for transmission. In addition to that the first receiving paper device 106A will also now server as the sender of the first question paper as shown in FIG. 3. The first question paper will be sent from the first receiving paper device 106A to the remaining plurality of receiving paper devices 106B, 106C, . . . 106N etc. corresponding to the first list of MAC numbers, thereby For example, first the master paper device 104 will look for the network with the some string pattern tagged for question paper set A. This will allow the master paper device 104 to connect with only those receiving paper devices which have created network whose connection credential will be of question paper set 1 pattern. Only the master paper device 104 will find one such network it will connect using the credentials which are also dynamic based on the MAC address of the receiving paper device and then will send the question paper to that receiving paper device. As soon as the master paper device 104 transfers the first set of question paper to at least 1 receiving paper device, then it will pick up the second set of question paper and dynamically look for a second Adhoc secure network tagged to the second set of question paper and same flow will be followed.

According to an embodiment of the disclosure, the first receiving paper device 106A which has already received the first set of question paper, will now act as a sender to the remaining receiving paper devices tagged to the first set of question papers. Same logic will be used by receiving paper device 106A to share the question paper with the remaining receiving paper devices 106B, 106C . . . 106N in the examination room.

Further, once the question paper is shared with the users, they will still not be able to open the question papers, since the shared question paper is a password protected question paper thus increasing the security of the question papers. According to an embodiment of the disclosure, the system 100 further ensures that the users will be able to open the question papers only a predefined minutes before the examination. The password is a pre-generated password. The password is generated by the cloud server 110.

According to an embodiment of the disclosure, the cloud server 110 is also configured to generate a QR code for approving the plurality of receiving paper devices 106 for examination. At the time of examination, the invigilator will approve the users receiving paper device 106 by scanning invigilator's QR code. After the scanning, the user's "start exam" button will be enabled on the screen of his receiving paper device 106.

According to an embodiment of the disclosure, the system 100, the device also comprises the scanning module 118 and the uploading module 120. Once the user opens the question paper, he/she can start attempting the question paper. The attempt of question paper results in the generation of an answer sheet. The scanning module 118 is then configured to scan the answer sheet of the user using a camera provided in the receiving paper device 106. The uploading module 120 is configured to upload the scanned answer sheet back on the cloud server 110. In an example, where the answer sheet is generated in the form of OMR sheet, the receiving paper device may be configured to generate the results of the examination on the fly as soon as the user finishes the question paper.

Once the examination is over, the receiving paper device 106 will go back in initial mode where it can be reused for another examination. The question paper will be deleted from the receiving paper device 106. The question paper can be made accessible to the users through an external link which can accessed from anywhere using the internet. To make the receiving paper device reusable, the distribution pin (D-Pin) security feature is also provided. A new D-pin will always be required to reuse the receiving paper device for another examination.

According to an embodiment of the disclosure, the system 100 is also configured to check the location of the each of the plurality of receiving paper devices 106. As soon as the question paper is downloaded on the user's receiving paper device 106, the receiving paper device 106 will capture the current coordinates of the receiving device location. In case during the examination, if the user tries to walk away with the receiving paper device 106 which is carrying the question paper then as soon as the candidate crosses ten meters radius then the question paper will get hidden in the receiving paper device 106 and the user will not be able to access the same and then as soon as the user will come up to his seat within the radius then only will be able to again access the question paper.

According to an embodiment of the disclosure, the device 102 also has an alarm generation module (not shown in Figures). At the start of examination itself the alarm generation module generates an audio or visual alarm to alert the user incase the battery is not sufficient to conduct the complete exam. The alarm generation module is also configured to alert the user when 30, 15 and 5 minutes of battery life is left in the device 102.

Figure 4:
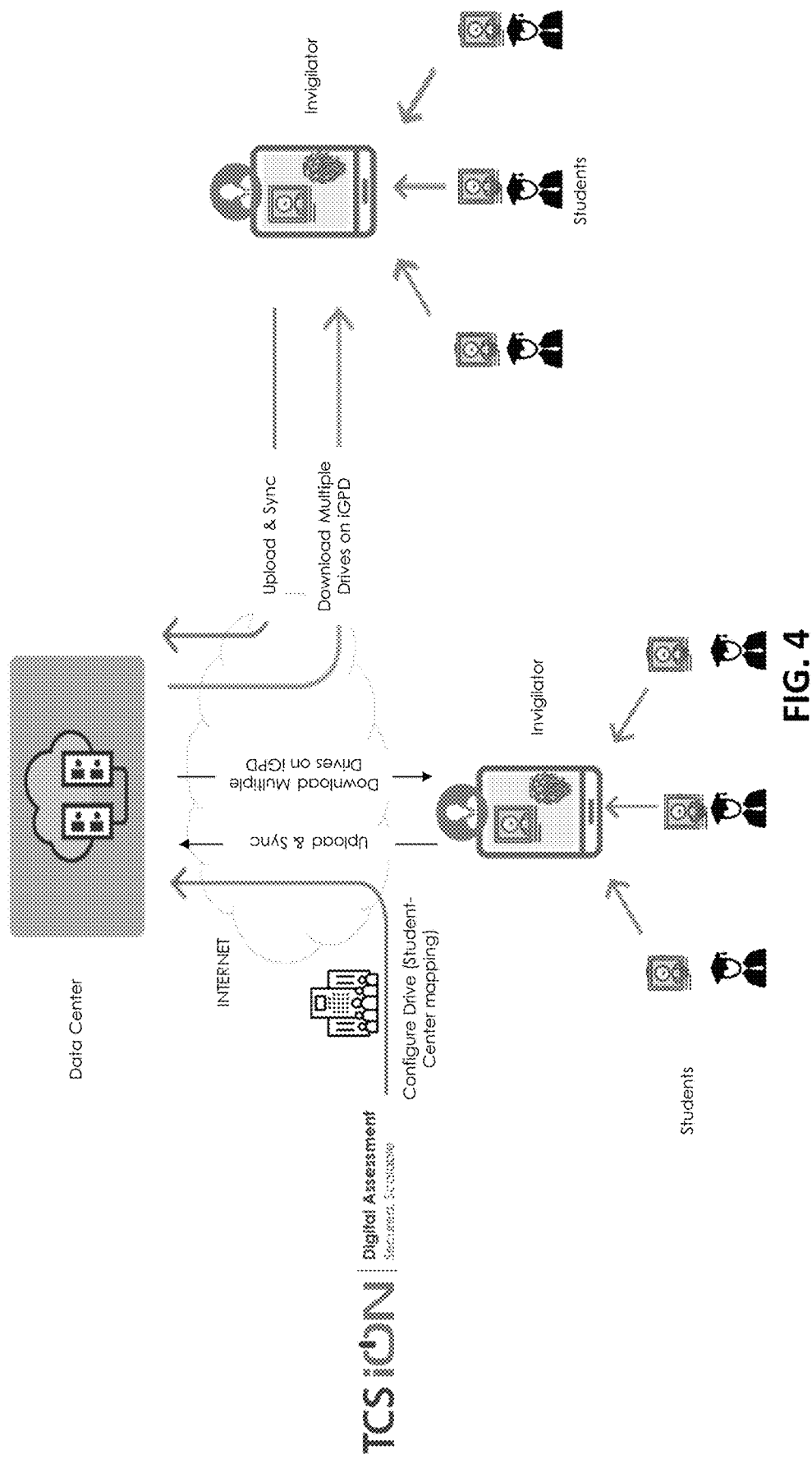
FIG. 4 an architectural diagram of the system of FIG. 1 for capturing the attendance of the user according to an embodiment of the present disclosure.

According to an embodiment of the disclosure, the plurality of receiving paper devices 106 can also be used to capture the attendance of the users appearing the examination as shown in the flowchart of FIG. 4. The attendance is captured using biometric details and photo of the user. In addition to that, the plurality of receiving paper devices 106 can also verify the identity of the user appearing for the examination. The verification can be performed either using a unique identification number based verification or a face comparison technique. The unique identification number such as Adhaar card number in India can be used for verifying the user. Only after the verification of the user, a 'start exam' button will get enabled in the user's receiving paper device.

According to an embodiment of the disclosure, the device 102 is also provided with an option of secure printing of the question paper. The printing can be provided only at the examination center using the portable printer connected with the master paper device 104.

According to an embodiment of the disclosure, the receiving paper device 106 is also configured to take the practical examination of the user, such as viva voce exam etc. The receiving paper device 106 is provided with a microphone and the camera which can be used to capture the audio and video response of the user.

Figure 5A:
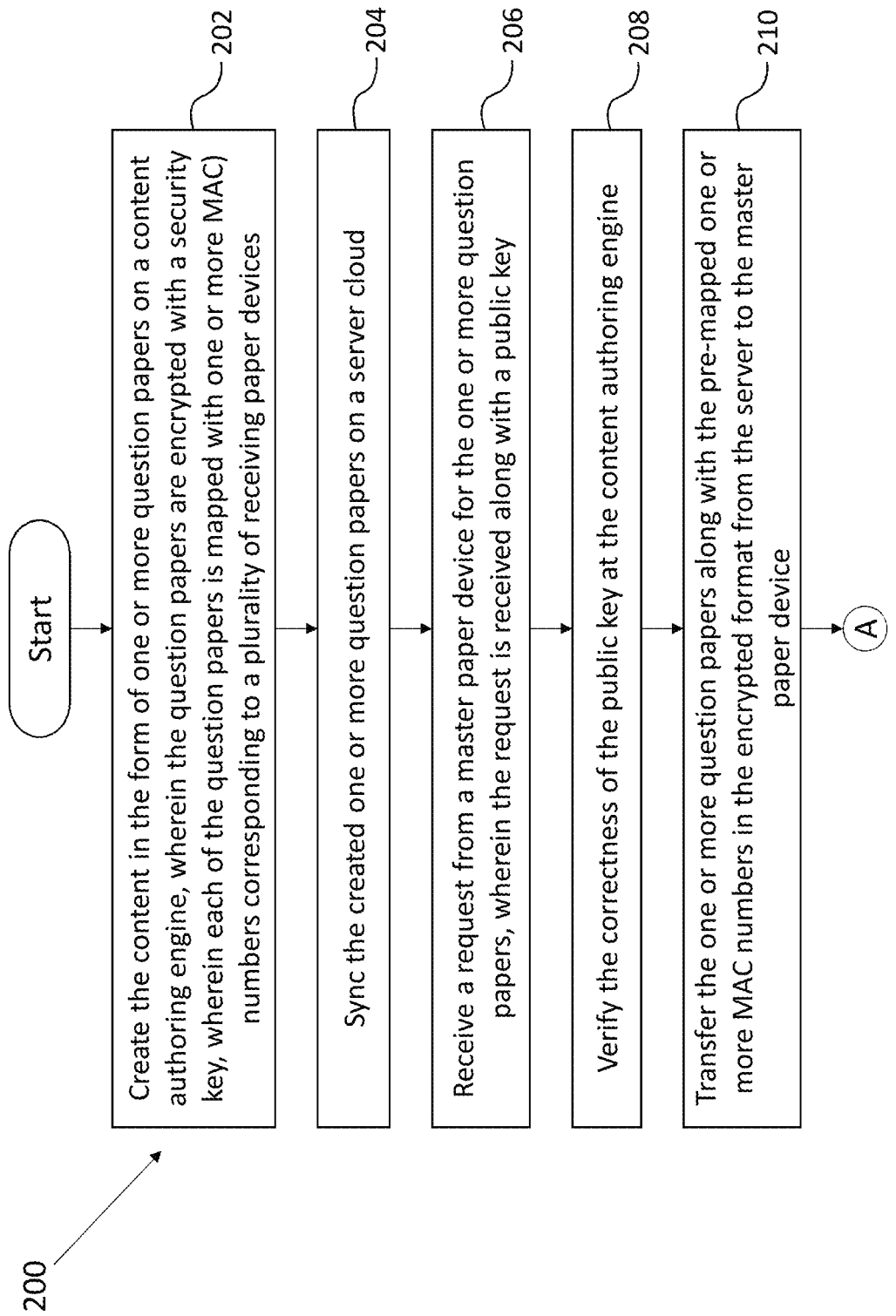
Figure 5C:
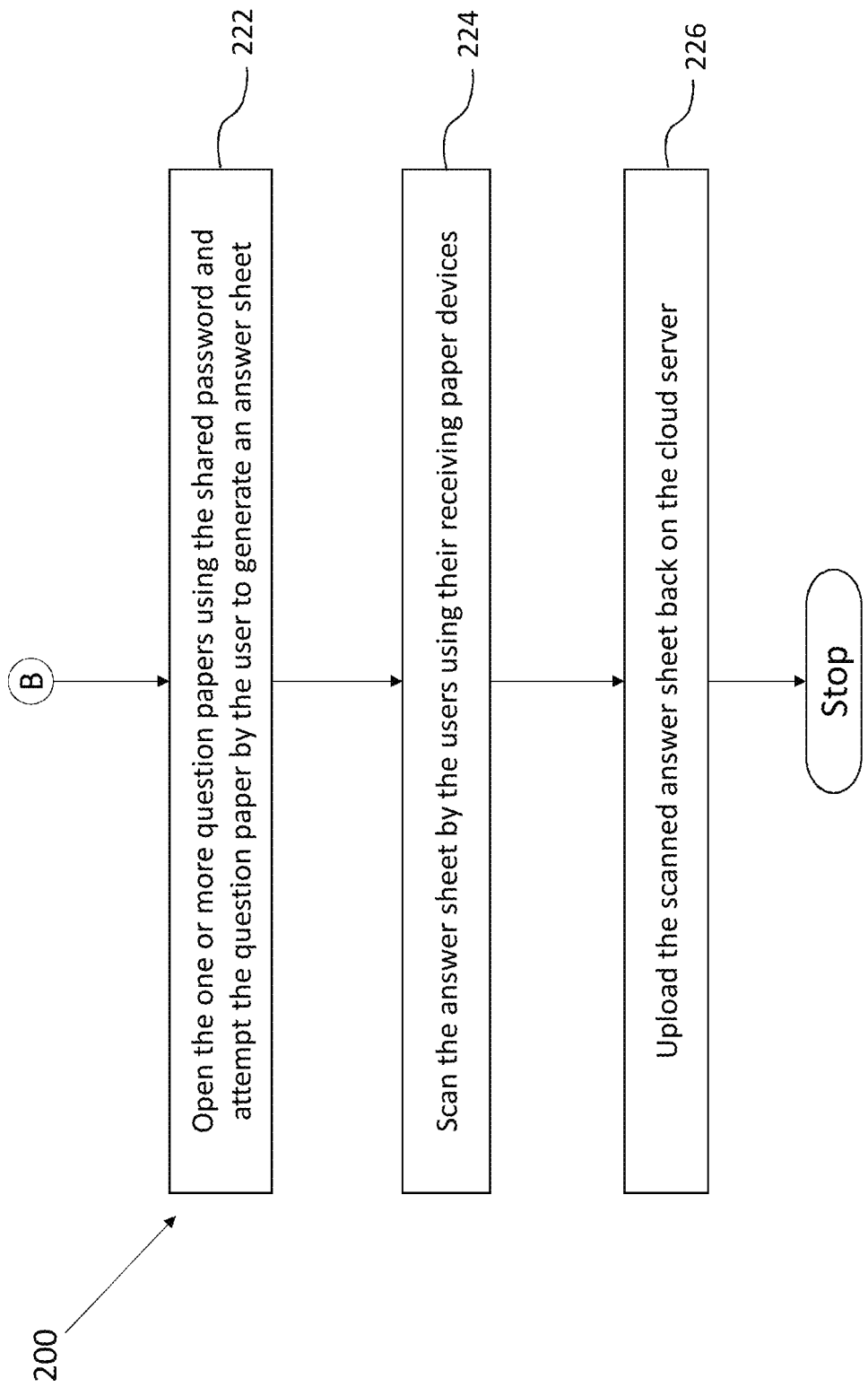

In operation, a flowchart 200 illustrating a method for distributing content in the examination is shown in FIG. 5A-5C. Initially, at step 202, the content is created in the form of one or more question papers on the content authoring engine 108. The one or more question papers are encrypted with a security key, wherein each of the one or more question papers is mapped with one or more media access control (MAC) numbers corresponding to a plurality of receiving paper devices. The one or more question paper can also be generated outside and then uploaded on the content authoring engine 108. At step 204, the created one or more question papers are synced on the cloud server 110.

In the next step 206, a request is received from a master paper device 104 for the one or more question papers, wherein the request is received along with a public key. At step 208, the correctness of the public key is verified at the content authoring engine 108. The use of public key ensures the validity of the master paper device 104 and security if the one or more question papers. In the next step 210, the one or more question papers are transferred along with the pre-mapped one or more MAC numbers in the encrypted format from the cloud server 110 to the master paper device 104.

In the next step 212, the plurality of receiving paper devices 106 are switched ON by the users using those. The switching ON results them to turn into a receiving mode, i.e., they start looking for the question papers. At step 214, a connection is set between the master paper device 104 and the first receiving paper device 106A out of the plurality of receiving paper devices 106 with the first Adhoc secure network as per a first list of MAC numbers corresponding the first question paper out of the one or more question papers. In the next step 216, the first question paper is sent from the master paper device 104 to the first receiving paper device 106A using the first Adhoc secure network. While sending the question paper, the master paper device 104 also shares the first list of MAC numbers after removing the MAC number of the first receiving paper device 106A from the first list. In the next step 218, the first question paper is further sent from the master paper device 104 and the first receiving paper device 106A to the remaining plurality of receiving paper devices corresponding to the first list of MAC numbers.

In the next step 220, the pre-generated password is shared by the cloud server 110 a predefined minutes before the examination with the users using the plurality of receiving paper devices 106, wherein the password is used to open the one or more question papers. Normally, the password is shared 10 minutes before the examination with the invigilator. And then invigilator writes the password on a board in the examination room at the start of the examination. In the next step 222, the one or more question papers is opened using the shared password. This question paper is then attempted by the user to generate the answer sheet. In the next step 224, the answer sheet is scanned by the users using their receiving paper devices 106. Normally the camera of the receiving paper device 106 can be used to scan the answer sheet. And finally, at step 226, the scanned answer sheet is uploaded back on the cloud server 110.

According to an embodiment of the disclosure, the system 100 can also be explained with the help of examples. In an example of the present disclosure, the device 102 is provided with following software and hardware specifications:
   Android operating system
   multilingual and time zone support
   Screen size 10.1" inches with HD display
   Capacitive multi-touch screen
   Rear Camera—8 MP auto focus|Front Camera—5 MP auto focus
   Mediatek MTK8321 Processor
   Zoom In and Zoom Out
   Adhoc Wi-Fi support
   Good battery backup and gang charger
   32 GB internal Memory (expandable upto 64 GB) and 2 GB RAM
   In built speaker and 3.5 mm audio jack The device 102 also have a few other applications/utility. According to an embodiment of the disclosure, the device 102 can also be used as a learning device along with any existing learning platform such as TCS iON digital learning platform.

According to another embodiment of the disclosure, the device 102 can also be used for the online assessment of the candidate in the online examination such as GRE, TOEFEL etc. In this mode the device 102 will be connected to the internet and the content such as examination paper can be securely provided just before the examination.

According to an embodiment of the disclosure, the idea Green paper device 102 can also be used for the assessment of candidates in the offline mode. The offline mode is used when there is poor internet/no internet connectivity such as in the rural area. The assessment will be stored on the device 102. As soon as the candidate's device connected to the internet, the device 102 will get synced to the cloud server 110.

The device 102 can also be used as a marking platform for assessing the answer sheets of candidates. Thus, there is no need of printing of the paper for the marking of the answer sheet. In an example, this facility an work with any existing marking platform such as TCS Ion marking platform According to an embodiment of the disclosure the device 102 can also be used monitoring using a camera present in the device. During the examination the device 102 will pass the visual recordings to the cloud server 110. The cloud server 110 will perform processing on the recordings and then will be further analyzed. In case of movement of the receiving paper device or any other foul activity in the examination room, these activities can be recorded and notified for further actions.

According to another embodiment of the disclosure, the device 102 can also be used to conduct a digital survey in the offline mode. The survey can be captured in the offline mode and whenever all the devices comes online, they can be synced together to generate the results of the survey. Similarly, the device 102 can used in the offline mode for registration of the candidates and other formality, whenever it comes online then it can be synced up with the cloud server 110.

According to another embodiment of the disclosure, the device 102 can also be used for sniffing of any other signal such as Bluetooth or Wi-Fi in the examination room. As soon as the Bluetooth or the Wi-Fi signal is detected, this information can be sent to the cloud server mentioning the details of detected Bluetooth or Wi-Fi signal in the examination center for the further action.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein solves the problems related with maintaining the security of question paper before conducting the examination. The disclosure provides a method and system for secure distribution of content in the examination.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method (200) for distributing a content in an examination, the method comprising a processor implemented steps of:
   creating the content in the form of one or more question papers on a content authoring engine, wherein the one or more question papers are encrypted with a security key, wherein each of the one or more question papers is pre-mapped with one or more media access control (MAC) numbers corresponding to a plurality of receiving paper devices (202);
   syncing the created one or more question papers on a server cloud (204);
   receiving a request from a master paper device for the one or more question papers, wherein the request is received along with a public key (206);
   verifying the correctness of the public key at the content authoring engine (208);
   transferring the one or more question papers along with the pre-mapped one or more MAC numbers in the encrypted format from the server to the master paper device (210);
   switching ON the plurality of receiving paper devices, wherein the switching ON results in the plurality of receiving paper devices to turn into a receiving mode (212);
   setting a connection between the master paper device and a first receiving paper device out of the plurality of receiving paper devices with a first Adhoc secure network as per a first list of MAC numbers corresponding a first question paper (214);
   sending the first question paper from the master paper device to the first receiving paper device using the first Adhoc secure network (216);
   sending the first question paper from the first receiving paper device to the remaining plurality of receiving paper devices corresponding to the first list of MAC numbers (218);
   sharing a pre-generated password by the cloud server a predefined minutes before the examination with users using the plurality of receiving paper devices, wherein the password is used to open the one or more question papers (220);
   opening the one or more question papers using the shared password and attempting to answer the first question paper of the one or more question papers by a user to generate an answer sheet (222);
   scanning the answer sheet by using the plurality of receiving paper devices of the users (224); and
   uploading the scanned answer sheet back on the cloud server (226).

2. The method of claim 1 further comprising the step of sharing a second question paper to the plurality of receiving paper devices corresponding to a second list of MAC numbers using a second Adhoc secure network.

3. The method of claim 1 further comprising the step of detecting a movement of a receiving paper device away from the receiving paper device location which was at the start of the examination.

4. The method of claim 3 further comprising the step of wiping out the first question paper from the receiving paper device and the master paper device.

5. The method of claim 1 further comprising the step of capturing the attendance of the users appearing for the examination, wherein the attendance is captured using biometric details and photo of the user.

6. The method of claim 1 further comprising the step of verifying the identity of the users using one or more of a unique identification number based verification a biometric verification or a face comparison technique.

7. The method of claim 1, wherein the ad-hoc secured network, and the ad-hoc secured network SSID and connection credentials are programmatically generated depending on the MAC number.

8. The method of claim 1, wherein the password is written on a board in the examination room just before the start of the examination.

9. The method of claim 1, wherein the plurality of receiving paper devices are mapped with roll numbers of respective users.

10. The method of claim 1, wherein the first question paper is one or more of an objective type or a subjective type.

11. The method of claim 1, wherein the question papers are encrypted with AES 256 Bit encryption by author provided key.

12. The method of claim 1 wherein the first question paper is created either by manually writing on the content authoring engine or by uploading an already prepared question paper on the content authoring engine in a predefined format.

13. The method of claim 1 wherein each of the plurality of receiving paper devices are having a unique media access control (MAC) number.

14. The method of claim 1 further comprising the step of providing the question papers to the users using a website link after the completion of the examination.

15. The method of claim 1 further comprising the step of conducting an audio or a video based assessment of the candidate using the receiving paper device in an offline mode.

16. The method of claim 1 further comprising a step of managing a time period of the examination into more than part depending more than one sections of the first question paper.

17. The method of claim 1 further comprising the step of printing the first question paper into a hard copy.

18. A system (100) for distributing a content in an examination, the system comprises:
- a content authoring engine (108) configured to create the content in the form of one or more question papers, wherein the one or more question papers are encrypted with a security key, wherein each of the one or more question papers is pre-mapped with one or more media access control (MAC) numbers;
- a cloud server (110) configured to:
  - sync the created one or more question papers,
  - receive a request for access the one or more question papers, wherein the request is received along with a public key,
  - verify the correctness of the public key at the content authoring engine,
  - transfer the one or more question papers along with the pre-mapped one or more MAC numbers in the encrypted format, and
- a master paper device (104) configured to receive the one or more question papers from the cloud server along with the pre-mapped one or more MAC numbers in the encrypted format, the master paper device further configured to send the one or more question papers; and
- a plurality of receiving paper devices (106) configured to receive one or more question papers from the master paper device, wherein the plurality of receiving paper devices further configured to perform the steps of:
  - setting a connection between the master paper device and a first receiving paper device (106A) out of the plurality of receiving paper devices with a first Adhoc secure network as per a first list of MACs corresponding to a first question paper using a connection setting module (116), wherein the connection is used to transfer the first question paper from the master paper device to the first receiving paper device;
  - sending the first question paper from the first receiving paper device to the remaining plurality of receiving paper devices corresponding to the first list of MAC numbers;
  - opening the one or more question papers using a pre-generated password and attempting to answer the first question paper of the one or more question papers by a user to generate an answer sheet, wherein the password is a pre-generated password generated by the cloud server a predefined minutes before the examination and shared with users using the plurality of receiving paper devices,
  - scanning the answer sheet by using the plurality of receiving paper devices of the users using a scanning module (118); and
  - uploading the scanned answer sheet back on the cloud server using the uploading module (120).

19. One or more non-transitory machine readable information storage mediums comprising one or more instructions which when executed by one or more hardware processors cause:
- creating a content in the form of one or more question papers on a content authoring engine, wherein the one or more question papers are encrypted with a security key, wherein each of the one or more question papers is pre-mapped with one or more media access control (MAC) numbers corresponding to a plurality of receiving paper devices;
- syncing the created one or more question papers on a server cloud;
- receiving a request from a master paper device for the one or more question papers, wherein the request is received along with a public key;
- verifying the correctness of the public key at the content authoring engine;
- transferring the one or more question papers along with the pre-mapped one or more MAC numbers in the encrypted format from the server to the master paper device;
- switching ON the plurality of receiving paper devices, wherein the switching ON results in the plurality of receiving paper devices to turn into a receiving mode;
- setting a connection between the master paper device and a first receiving paper device out of the plurality of receiving paper devices with a first Adhoc secure network as per a first list of MAC numbers corresponding a first question paper;
- sending the first question paper from the master paper device to the first receiving paper device using the first Adhoc secure network;
- sending the first question paper from the first receiving paper device to the remaining plurality of receiving paper devices corresponding to the first list of MAC numbers;
- sharing a pre-generated password by the cloud server a predefined minutes before the examination with users using the plurality of receiving paper devices, wherein the password is used to open the one or more question papers;
- opening the one or more question papers using the shared password and attempting to answer the first question paper of the one or more question papers by a user to generate an answer sheet;
- scanning the answer sheet by using the plurality of receiving paper devices of the users; and
- uploading the scanned answer sheet back on the cloud server.

\* \* \* \* \*